US009405294B2

(12) United States Patent
Jägenstedt et al.

(10) Patent No.: US 9,405,294 B2
(45) Date of Patent: Aug. 2, 2016

(54) METHOD AND SYSTEM FOR GUIDING A ROBOTIC GARDEN TOOL (75) Inventors: Patrik Jägenstedt, Tenhult (SE); Bengt-Allan Bergvall, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 13/824,625

(22) PCT Filed: Oct. 1, 2010

(86) PCT No.: PCT/SE2010/051061
§ 371 (c)(1),
(2), (4) Date: Mar. 18, 2013

(87) PCT Pub. No.: WO2012/044220
PCT Pub. Date: Apr. 5, 2012

(65) Prior Publication Data
US 2013/0184924 A1  Jul. 18, 2013

(51) Int. Cl.
*G05D 1/02* (2006.01)
*A01D 34/00* (2006.01)
*B60L 15/20* (2006.01)

(52) U.S. Cl.
CPC ............ *G05D 1/0259* (2013.01); *A01D 34/008* (2013.01); *B60L 15/20* (2013.01); *G05D 1/0265* (2013.01); *B60L 2200/40* (2013.01); *B60L 2240/36* (2013.01); *B60L 2240/421* (2013.01); *B60L 2260/32* (2013.01); *G05D 2201/0208* (2013.01); *Y02T 10/645* (2013.01);
(Continued)

(58) Field of Classification Search
CPC . G05D 1/0227; G05D 1/0242; G05D 1/0272; G05D 2201/0203; G05D 2201/0215
See application file for complete search history.

(56) References Cited

U.S. PATENT DOCUMENTS 4,310,789 A * 1/1982 Mank et al. ............... 318/587
4,656,406 A * 4/1987 Houskamp ................ 318/587
(Continued)

FOREIGN PATENT DOCUMENTS

FR  2638255 A1  4/1990
GB  1289474 A   9/1972
GB  2358843 A   8/2001

OTHER PUBLICATIONS

"A GPS-aided Autonomous Lawnmower," The Miami Red Blade, printed from http://www.eas.mohio.edu/fileadmin/departments/ece/downloads/ION_Mower_Report_Compressed.pdf.
(Continued)

*Primary Examiner* — John R Olszewski
*Assistant Examiner* — Nicholas K Wiltey
(74) *Attorney, Agent, or Firm* — Nelson Mullins Riley & Scarborough LLP (57) ABSTRACT Method and system for guiding a robotic garden tool (100) is disclosed. The robotic garden tool (100) may include at least two sensing means (108, 110, and 202). The robotic garden tool (100) is equipped to follow along a guiding wire (402) on a lawn (400). While the robotic garden tool (100) moves along the guiding wire (402), the sensing means (108, 110, and 202) may detect a magnetic field strength generated from current carrying guiding wire (402). The method (500) and the system (300) is equipped to provide instructions to the robotic garden tool (100) to follow the guiding wire (402) based on the difference of magnetic field strength sensed by at least two sensing means (108, 110, and 202).

20 Claims, 5 Drawing Sheets (52) U.S. Cl.
CPC ............. *Y02T 10/72* (2013.01); *Y02T 10/7275* (2013.01); *Y10S 901/01* (2013.01)

(56) References Cited

U.S. PATENT DOCUMENTS

| | | | |
|---|---|---|---|
| 4,658,928 A * | 4/1987 | Seo ................ | 180/168 |
| 4,674,048 A * | 6/1987 | Okumura ........................ | 701/25 |
| 5,001,635 A * | 3/1991 | Yasutomi et al. ................ | 701/26 |
| 5,187,664 A | 2/1993 | Yardley et al. | |
| 5,404,087 A * | 4/1995 | Sherman ........................ | 318/587 |
| 5,650,703 A | 7/1997 | Yardley et al. | |
| 5,938,704 A * | 8/1999 | Torii .............................. | 701/23 |
| 5,974,347 A * | 10/1999 | Nelson ............................ | 701/22 |
| 6,255,793 B1 * | 7/2001 | Peless et al. ................... | 318/580 |
| 6,321,515 B1 | 11/2001 | Colens | |
| 6,971,464 B2 * | 12/2005 | Marino et al. ................. | 180/167 |
| 8,027,761 B1 * | 9/2011 | Nelson ............................ | 701/23 |
| 8,433,468 B2 * | 4/2013 | Johnson ............... | A01D 34/008 700/245 |
| 8,461,803 B2 * | 6/2013 | Cohen et al. ................... | 320/109 |
| 8,781,627 B2 * | 7/2014 | Sandin et al. ................. | 700/258 |
| 2001/0022506 A1 * | 9/2001 | Peless et al. ................... | 318/580 |
| 2002/0140393 A1 * | 10/2002 | Peless et al. ................... | 318/580 |
| 2003/0023356 A1 * | 1/2003 | Keable ............................ | 701/23 |
| 2007/0179690 A1 * | 8/2007 | Stewart ............................ | 701/23 |
| 2010/0185353 A1 * | 7/2010 | Barwick et al. ................. | 701/23 |
| 2012/0109440 A1 * | 5/2012 | Wyatt et al. .................... | 701/22 |

OTHER PUBLICATIONS

International Search Report and Written Opinion of PCT/SE2010/051061 mailed May 3, 2011.

Chapter I International Preliminary Report on Patentability of PCT/SE2010/051061 mailed Apr. 2, 2013.

* cited by examiner

METHOD AND SYSTEM FOR GUIDING A ROBOTIC GARDEN TOOL

TECHNICAL FIELD

The present invention relates to a robotic garden tool. More particularly, it relates to a system and a method for navigating the robotic garden tool for example a robotic lawnmower.

BACKGROUND

The robotic garden tools, for example, but not limited to, robotic lawnmowers are extensively used for lawn maintenance activities. Typically, a robotic lawnmower is an autonomous robotic tool and uses battery as a power source. Based on the operating load and duration, there is a need to recharge the battery of the robotic lawnmower periodically. As an autonomous robotic lawnmower work unattended, it is required to find a path to a charging station in case the battery power level falls below a threshold power level during operation.

There are many techniques which are currently used to guide the robotic lawnmower back to the charging station. Firstly, an antenna built on the charging station may be used to navigate the robotic lawnmower to the charging station. However, the antenna may have a limited range in a vicinity of the charging station and thus, there is a possibility that the robotic lawnmower may randomly navigate until it comes close to the charging station. Alternatively, the robotic lawnmower may follow a guide wire that may be used to navigate the robotic lawnmower to the charging station. The guide wire may be a perimeter delimiter or a through wire in the lawn intended to guide the robotic lawnmower and the robotic lawnmower is provided one or more sensors to sense the intensity of a magnetic field generated by the guide wire. However, the robotic lawnmower may follow a same path each time and this may result in undesirable permanent visible tracks and/or makings on the lawn.

To overcome the above mentioned disadvantages, robotic lawnmowers are programmed to follow the guide wire at a distance. This distance is randomly selected each time the robotic lawnmower navigates to the charging station. The robotic lawnmower follows fixed magnetic field intensity while traveling back to the charging station. The fixed magnetic field intensity is randomly selected from one cycle to another. Thus, the robotic lawnmower takes a different path each time it goes to the charging station. This approach effectively addresses the problem of visible tracks on the lawn. However, this approach does not work properly in narrow passages within the lawn. For example, if the randomly selected magnetic field intensity by the robotic lawnmower is small the robotic lawnmower may find it difficult to navigate through the narrow passages.

Also the magnetic field intensity may depend on a variety of factors which might vary dynamically. Such factors may include current in the guide wire, presence of external magnetic objects, change in temperature of electronic components of the garden tool and tolerances of sensor electronics of the robotic lawnmower.

Thus there is a need for an improved system and method to navigate a robotic lawnmower to the charging station.

SUMMARY

In view of the above, it is an objective to solve or at least reduce the problems discussed above. In particular, an objective is to provide an improved guiding system for a garden tool for efficient navigation of the garden tool.

The objective is at least partially achieved by using a guiding system for a robotic garden tool according to claim 1. The guiding system includes at least one guiding wire adapted to conduct electric current such that a magnetic field is generated adjacent to the guiding wire. The robotic garden tool is adapted to follow the guiding wire at a distance. The robotic garden tool further includes a first sensing means and a second sensing means. The first and second sensing means are placed on the robotic garden tool such that they will be located at different distances with respect to the guiding wire. Further, the first and second sensing means are adapted to detect strength of the magnetic field. According to the present invention, the robotic garden tool is steered based on a difference between the detected magnetic field strengths by the first and second sensing means. The use of relative difference of the detected magnetic field strengths ensures that the robotic garden tool may follow different tracks in each operating cycle and thus, reduces the severity of visible marks on the lawn. Moreover, the use of relative difference also ensures that the robotic garden tool may not get stuck in any area of the lawn and even pass through a narrower passage.

According to claim 2, at least one of the first sensing means and the second sensing means may be adapted to detect the strength of a vertical component in the magnetic field. The vertical component in the magnetic field may be the part of the magnetic field extending in a vertical direction when the boundary wire, around which the magnetic field is generated, extends in a substantially horizontal plane. The vertical component in the magnetic field may be detected by at least one of the sensing means by means of a vertical loop sensor, a coil, a Hall sensor or the like.

According to claim 3, the first and second sensing means may be placed with a distance between each other along the longitudinal axis of the garden tool. One of the sensing means is thereby placed further towards the front of the garden tool than the other sensing means. Further, according to claim 4, the distance between the sensing means along the longitudinal axis may be in the range of 4-30 cm, preferably in the range of 5-20 cm, and more preferably in the range of 10-15 cm.

According to claim 5, the distance between the first sensing means and the second sensing means in a direction perpendicular to a longitudinal axis of the robotic garden tool may be between 5-35 cm, preferably between 10-30 cm, more preferably between 15-25 cm, and most preferably about 20 cm. Thereby, the distance between the guiding wire and the first sensing means may differ from the distance between the guiding wire and the second sensing means. Thereby, different signals strengths may be detected in the two sensing means.

According to claim 6, the robotic garden tool may further comprise a third sensing means. The three sensing means may be placed on the robotic garden tool in a triangle shape, such that the second sensing means and the third sensing means may be placed along a line substantially perpendicular to the longitudinal axis of the robotic garden tool. The first sensing means may be placed in front of the line along the longitudinal axis of the robotic garden tool. This ensures a movement of the robotic garden tool in both clockwise and anti-clockwise directions along the guiding wire. The steering may then be based on the difference between the detected magnetic field strength in the first sensing means and detected magnetic field strength in one of the second and the third sensing means, whichever is closer to the guiding wire. The steering may also be based on the difference between the detected magnetic field strength in the first sensing means and detected magnetic field strength in one of the second and the third sensing means, whichever is farther from the guiding wire.

According to claim 7, the distance between the first sensing means and the line along which the second sensing means and the third sensing means are placed, may be in the range of 4-30 cm, preferably in the range of 5-20 cm, and more preferably in the range of 10-15 cm.

According to claim 8, the angle between the longitudinal axis of the robotic garden tool and the line joining the first sensing means with any one of the second sensing means and the third sensing means may be in the range of 40-80°, preferably in the range of 50-70°, and more preferably in the range of 55-60°.

According to claim 9, the guiding wire may be the perimeter limiting wire of the lawn. Further according to claim 10, the guiding wire is adapted to conduct a non-constant current.

Claim 11 describes a method of guiding the robotic garden tool. The robotic garden tool is equipped with at least two sensing means. The robotic garden tool follows a guiding wire at a distance. The guiding wire may conduct electric current such that a magnetic current is generated adjacent to the guiding wire. Further, the two sensing means detects the strength of the magnetic field from the guiding wire. The first and second sensing means are placed in a manner such that they are at different distances from the guiding wire when the robotic garden tool is moving along the guiding wire. In an embodiment of the present invention, the robotic garden tool is steered based on a difference in the detected magnetic filed strength in the first sensing means and the second sensing means.

According to claim 12, the robotic garden tool may follow a path where the difference of magnetic field sensed by both the sensors is constant through out an operating cycle of the robotic garden tool.

According to claim 13, the robotic garden tool may detect the strength of the magnetic field from the guiding wire in a third sensing means. The second and the third sensing means may be placed along a line substantially perpendicular to the longitudinal axis of the robotic garden tool, and the first sensing means may be placed in front of the line on the longitudinal axis of the robotic garden tool. Thereby, the difference in detected magnetic field strength between the first sensing means and either of the second and the third sensing means may be used for steering the robotic garden tool, such that a guiding wire may be followed on either side of the robotic garden tool.

According to claim 14, the robotic garden tool is steered along the guiding wire based on the difference between the detected magnetic field strength in the first sensing means and detected magnetic field strength in one of the second sensing means and the third sensing means, whichever is closer to the guiding wire.

According to claim 15, the robotic garden tool is steered along the guiding wire based on the difference between the detected magnetic field strength in the first sensing means and detected magnetic field strength in one of the second sensing means and the third sensing means, whichever is farther from the guiding wire.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
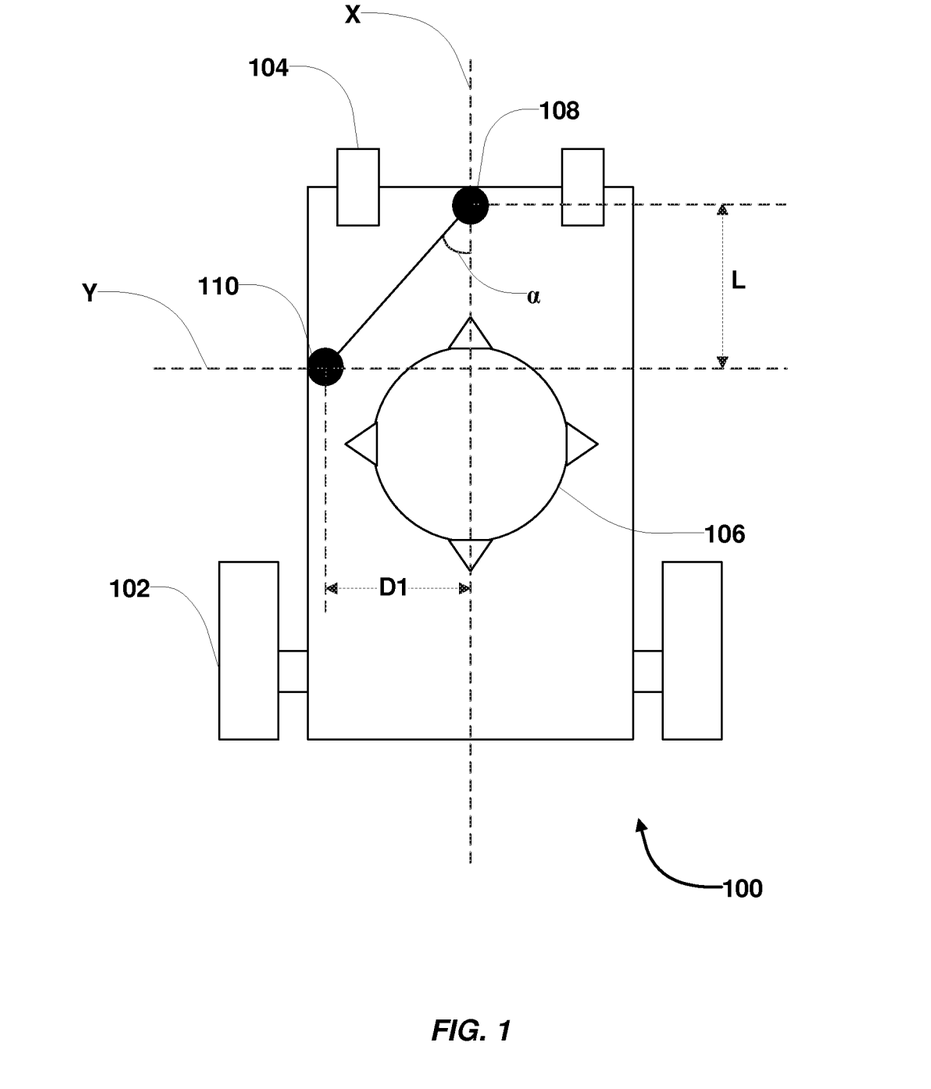
FIG. 1 shows a robotic garden tool, equipped with two sensing means, according to an embodiment of the present invention.

FIG. 1 shows a robotic garden tool 100 equipped with two sensing means, according to an embodiment of the present invention. In an embodiment of the present invention, the robotic garden tool 100 is a lawn mower. As shown in the FIG. 1, the robotic garden tool 100 consists of drive wheels 102 and castor wheels 104. In an embodiment of the present invention, the robotic garden tool 100 is equipped with a cutting system 106 for carrying out one or more operations in a lawn. Generally, the lawn is equipped with boundary wires, which may act as guiding wire for the robotic garden tool 100. In an embodiment of the present invention, the guiding wire is spread across a perimeter of the lawn, and is generally termed as perimeter limiting wire. In an embodiment of the present invention, the guiding wire may produce a magnetic field adjacent to the guiding wire, when an electric current is passed through the guiding wire. In various embodiments of the present invention, the guiding wire may conduct a non-constant current.

Further, as shown in FIG. 1, the robotic garden tool 100 includes a first sensing means 108 placed along a longitudinal axis X of the garden tool, and a second sensing means 110 placed along a line Y, which is orthogonal to the longitudinal axis X of the garden tool 100. In an embodiment of the present invention, the sensing means 108 and 110 may be vertical loop sensors. In various embodiments of the present invention, the first sensing means 108 may be placed further to the front of the garden tool than the second sensing means 110. As shown in FIG. 1, in an example embodiment of the present invention, the distance between the first sensing means 108 and the second sensing means 110 in the direction along the line Y is D1. In one embodiment of the present invention, the distance D1 between the first sensing means 108 and the second sensing means 110 in the direction along the line Y is 20 cm. In another embodiment of the present invention, the distance D1 may be in the range of 15-25 cm. In yet another embodiment of the present invention, the distance D1 may be in the range of 10-30 cm.

Further, in an embodiment of the present invention, the line joining the sensing means 108 and the second sensing means 110 may subtend an angle $\alpha$ with the longitudinal axis X of the robotic garden tool 100. In an embodiment of the present invention, the angle $\alpha$ may be in the range of 55-60°. In another embodiment the angle $\alpha$ may be in the range of 50-70°. In yet another embodiment of the present invention, the angle α may be in the range of 40-80°.

As shown in the FIG. 1, the first sensing means 108 is at an orthogonal distance L from the line Y, which line is substantially perpendicular to the normal driving direction of the robotic garden tool 100 and along which line the second sensing means 110 is placed. In an embodiment of the present invention, the orthogonal distance L, between the first sensing means 108 and the line Y may be in the range of 10-15 cm. In an alternate embodiment, the distance L may be in the range of 5-20 cm. In yet another embodiment of the present invention, the distance L may be in the range of 4-30 cm.

In an embodiment of the present invention, the first and second sensing means 108 and 110 may be placed on the robotic garden tool 100 such that the distance of the first and second sensing means 108 and 110 are different from the guiding wire with respect to each other, when the robotic garden tool 100 moves along the guiding wire. In various embodiments of the present invention, the sensing means 108 and 110 are equipped to detect strength of the magnetic field generated by the guiding wire. In an embodiment of the present invention, the sensing means 108 and 110, substantially senses a vertical component of the magnetic field produced by the guiding wire.

Generally, it is desired that the robotic garden tool 100 follows the guiding wire at a distance from the guiding wires. In various embodiments of the present invention, the distance from the guiding wire to be followed may be different in each operating cycle of the robotic garden tool 100. This may ensure that the robotic garden tool 100 may run in different tracks every time and thus reduces the severity of the visible tracks in the lawn. In an embodiment of the present invention, to ensure that the robotic garden tool 100 may run in different tracks in each operating cycle, the robotic garden tool 100 may be equipped with a processing unit (explained in conjunction with FIG. 3) which may provide one or more instructions to steering controller (explained in conjunction with FIG. 3) based on a difference in the detected magnetic field strength from the first sensing means 108 and the second sensing means 110. In various embodiments of the present invention, the steering controller may steer the robotic garden tool 100 along the guiding wire, based on one or more instructions from the processing unit, in a manner to substantially maintain a constant ratio of the detected magnetic field strength by the sensing means 108 and 110.

Figure 2:
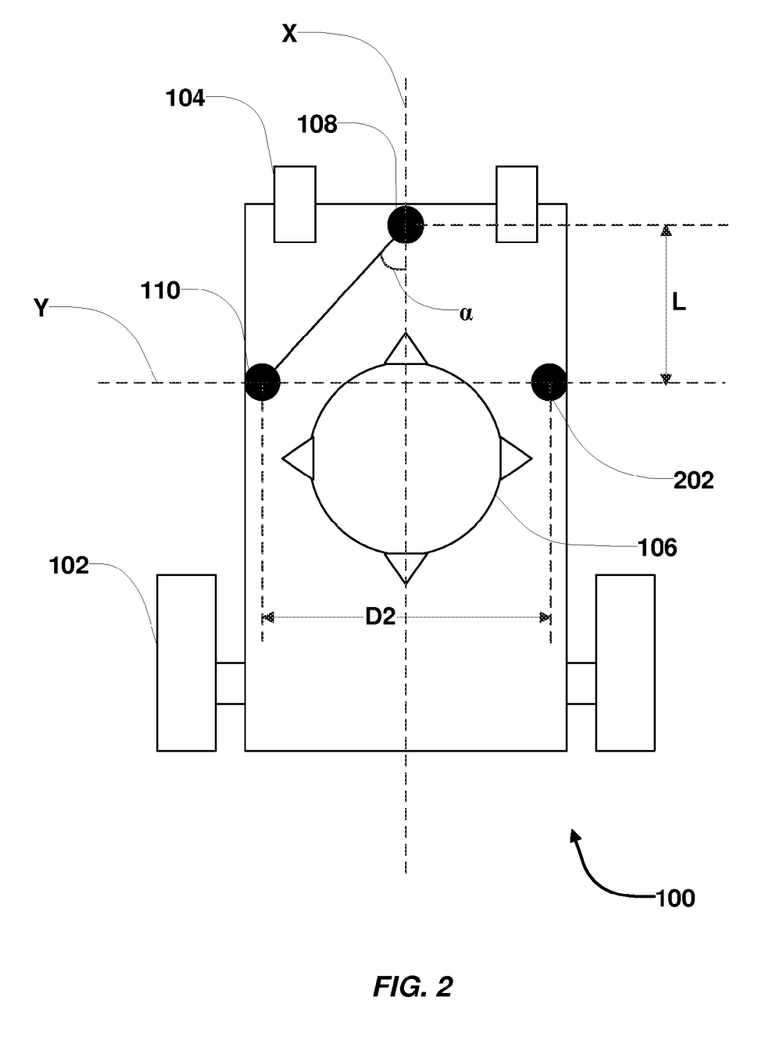
FIG. 2 shows a robotic garden tool, equipped with three sensing means, according to another embodiment of the present invention.

FIG. 2 shows the robotic garden tool 100 according to another embodiment of the present invention. In an embodiment of the present invention, in addition to the first sensing means 108 and the second sensing means 110, the robotic garden tool 100 further consists of a third sensing means 202 placed on the line Y.

In various embodiments of the present invention, the arrangement of the three sensing means 108, 110, and 202 may be mounted in both front and rear part of the robotic garden tool 100 if the robotic garden tool 100 is designed to drive in both directions. In various embodiments of the present invention, the three sensing means 108, 110, and 202 may allow the robotic garden tool 100 to follow the guiding wire in both clockwise and counter clockwise directions. The second sensing means 110 and the third sensing means 202 may be placed with a distance D2 between each other along the line Y. The distance D2 may be in the range of twice the distance D1.

The second and the third sensing means 110 and 202 may in one embodiment be placed at the rear of the garden tool 100. The distance L between the first sensing means 108 and the line Y may then be longer, and the angle a between the line joining the first and the second sensing means 108 and 110 and the longitudinal axis X may be smaller.

In an embodiment of the present invention, magnetic field strengths detected by the first sensing means 108 and one of the second or third sensing means 110 and 202 are compared for the steering of the robotic garden tool 100. In an embodiment of the present invention, the processing unit provided in the robotic garden tool 100 may provide one or more instructions to the steering controller based on a relative difference in the magnetic field strength detected by the first sensing means 108 and one of the second or third sensing means 110 and 202. In an embodiment of the present invention, the processing unit consider the relative difference between the magnetic field strength detected by the first sensing means 108 and any one of the second sensing means 110 or the third sensing means 202, whichever senses higher magnetic field strength (or is closer to the guiding wire), for guiding the robotic garden tool 100. In an alternate embodiment of the present invention, the processing unit consider the relative difference between the magnetic field strength detected by the first sensing means 108 and any one of the second sensing means 110 or the third sensing means 202, whichever senses lower magnetic field strength (or is farther from the guiding wire), for guiding the robotic garden tool 100.

Figure 3:
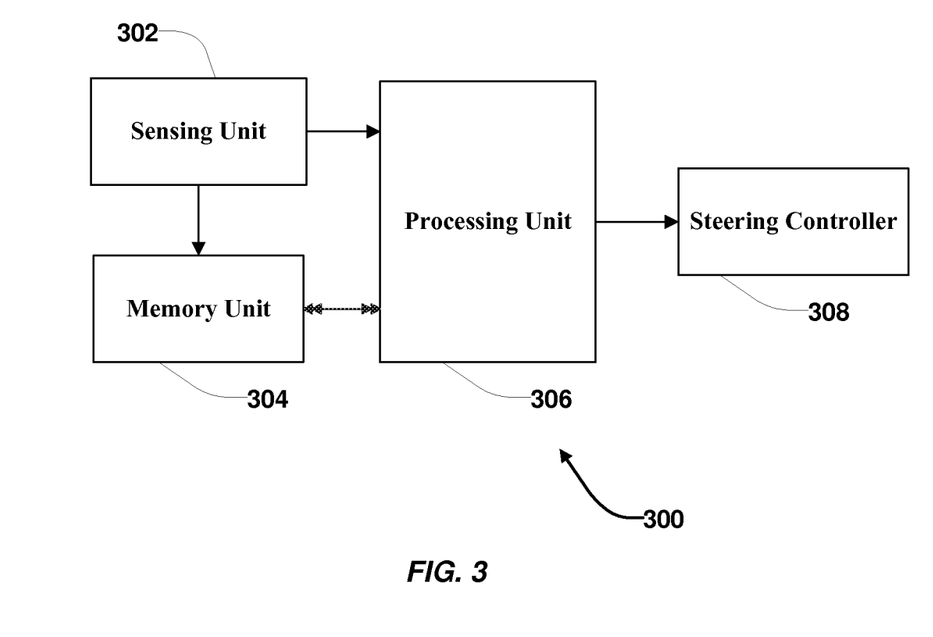
FIG. 3 shows a block diagram a guiding system for robotic garden tool, according to an embodiment of the present invention.

FIG. 3 shows the block diagram of a guiding system 300 for robotic garden tool 100 according to an embodiment of the present invention. The system 300 may include a sensing unit 302, which may include a plurality of sensing means (108, 110, and 202). The sensing unit is adapted to sense the magnetic field strength from a guiding wire 402, as shown in the FIG. 4, which depicts a lawn 400, with various zones such as 410, 420 and 430.

As shown in the FIG. 3, the guiding system 300 further includes a memory unit 304. The memory unit 304 is utilized to store the detected magnetic field strengths from the sensing means 302. Further, the guiding system 300 further includes a processing unit 306 which may be utilized to provide operating instructions to a steering controller 308 of the robotic garden tool 100. In an embodiment of the present invention, the processing unit 306 provides instructions to the steering controller 308 based on the detected magnetic field strength which is either stored in the memory unit 304 or received directly form the sensing means 302. In various embodiments of the present invention, the processing unit 302 may provide an instruction to the steering controller 308 to steer the robotic garden tool 100 based on a relative difference between the detected magnetic field strength from sensing means 108, 110 and 202. In one embodiment of the present invention, the relative difference is considered between the magnetic field strength detected by first and second sensing means 108 and 110. In another embodiment of the relative difference is considered between the magnetic field strength detected by the first sensing means 108 and any one of the second sensing means 110 or the third sensing means 202, whichever senses higher magnetic field strength (or is closer to the guiding wire), for guiding the robotic garden tool 100. In an alternate embodiment of the present invention, the relative difference is considered between the magnetic field strength detected by the first sensing means 108 and any one of the second sensing means 110 or the third sensing means 202, whichever senses lower magnetic field strength (or is farther from the guiding wire), for guiding the robotic garden tool 100.

In an embodiment of the present invention, the processing unit 306 may generate a reference value $\Delta_{ref}$, for finding relative difference in the magnetic field strength. The reference value $\Delta_{ref}$ may be randomly generated during every operating cycle of the robotic garden tool 100. The purpose of randomly selecting $\Delta_{ref}$ is to ensure that the garden tool follows the guiding wire at different distance in every operating cycle. This may ensure in avoiding the formation of visible tracks on the garden. For example, if the reference value $\Delta_{ref}$ is set at 10%, then the steering control may steer the robotic garden tool 100 at 10% relative difference in the magnetic field strength detected by the sensing means 108, 110 and 202. In such cases, the relative change in the magnetic field strength next to a straight line may always vary in the same way and independent of the absolute value of the magnetic filed strength. In various embodiments of the present invention, the use of relative difference between the detected magnetic strength may provide the guiding system 300, which is insensitive to one or more factors upon which the absolute value of the magnetic filed strength may depend. The one or more factors may include, but not limited to, an electric current flowing in the guiding wire, distance between the guiding wires in passages, depth of guiding wires in the soil, magnetic objects in the surroundings, tolerances of the sensing means (108, 110, and 202), temperature variation on the other electronics parts of the robotic garden tool 100 and the like.

Figure 4:
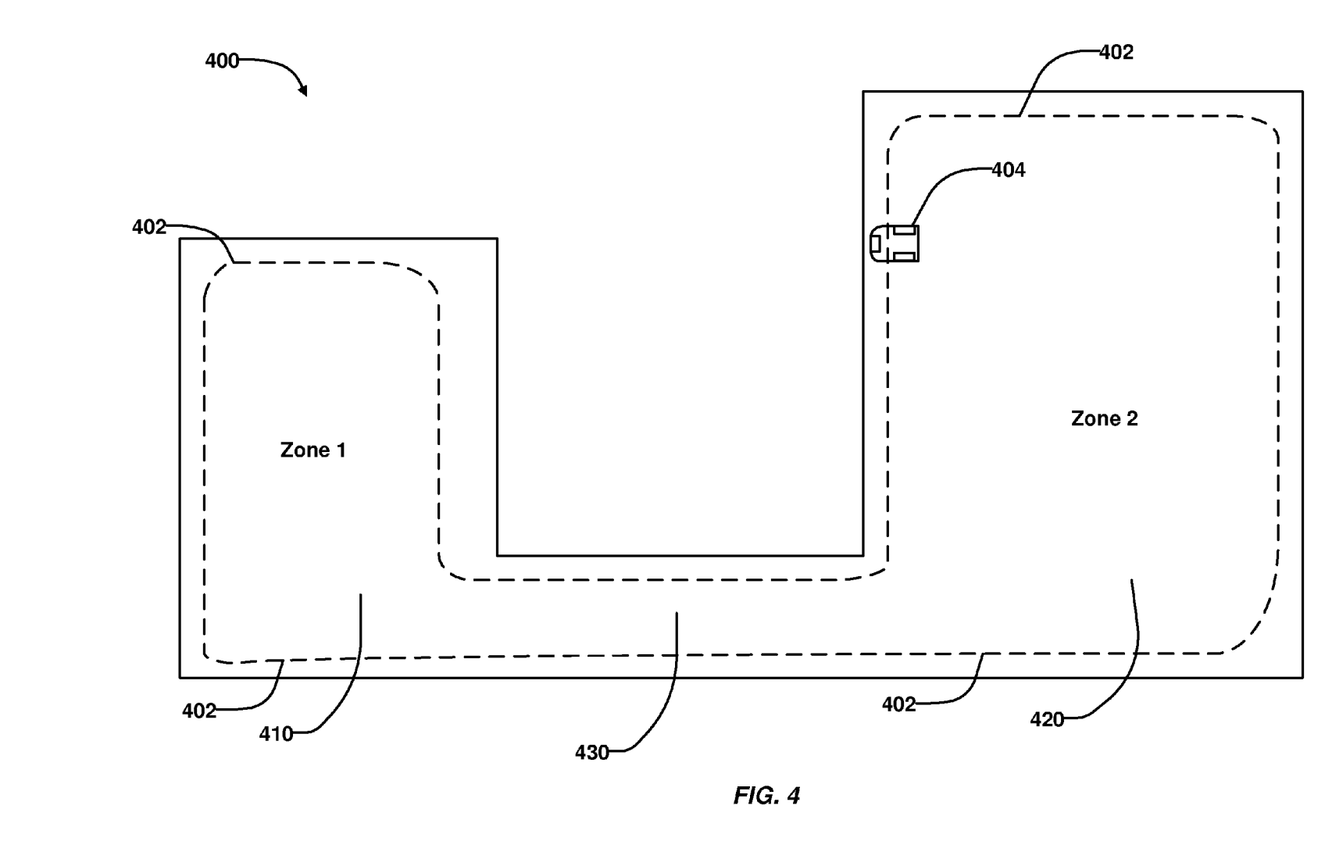
FIG. 4 shows a layout of a lawn with various passages, according to an embodiment of the present invention.

Further, in various embodiments of the present invention, the use of the relative difference also allows the robotic garden tool 100 to pass through narrow passages in the lawn 400. For example, if the robotic garden tool 100 is in zone 1 410, and the processing unit 306 provides instruction to the steering control to move the robotic garden tool 100 to charging station 404, which is in zone 2 420, then the robotic garden tool 100 is required to pass through the narrow passage 430. However, as shown in FIG. 4, if absolute value of the magnetic field strength is considered then the robotic garden tool 100 may not be able to pass from the zone 1 410 to Zone 2 420 as the robotic garden tool 100 needs to cross the narrow passage 430. However, if the guiding system 100 uses the relative difference between the detected magnetic strength, then the robotic garden tool 100 may cross the narrow passage 430 and reach the charging station 404 along the guiding wire 402. Generally, the value of the magnetic field strength falls sharply when closed to the guiding wire 402 as compared to the when farther away from the wire. Thus, even if a low relative difference is set, to get far away from the guiding wire 402, the steering controller 308 may always find the path based on the relative difference as the magnetic field strength may always turn direction and get higher again when the robotic garden tool 100 approach the other side of the passage 430. Therefore, the relative difference between the magnetic strength detected by any two of the sensing means 108, 110 and 202, may not only be zero but may get negative, if the robotic garden tool 100 approaches opposite guiding wire 402 in the narrower passage.

Figure 5:
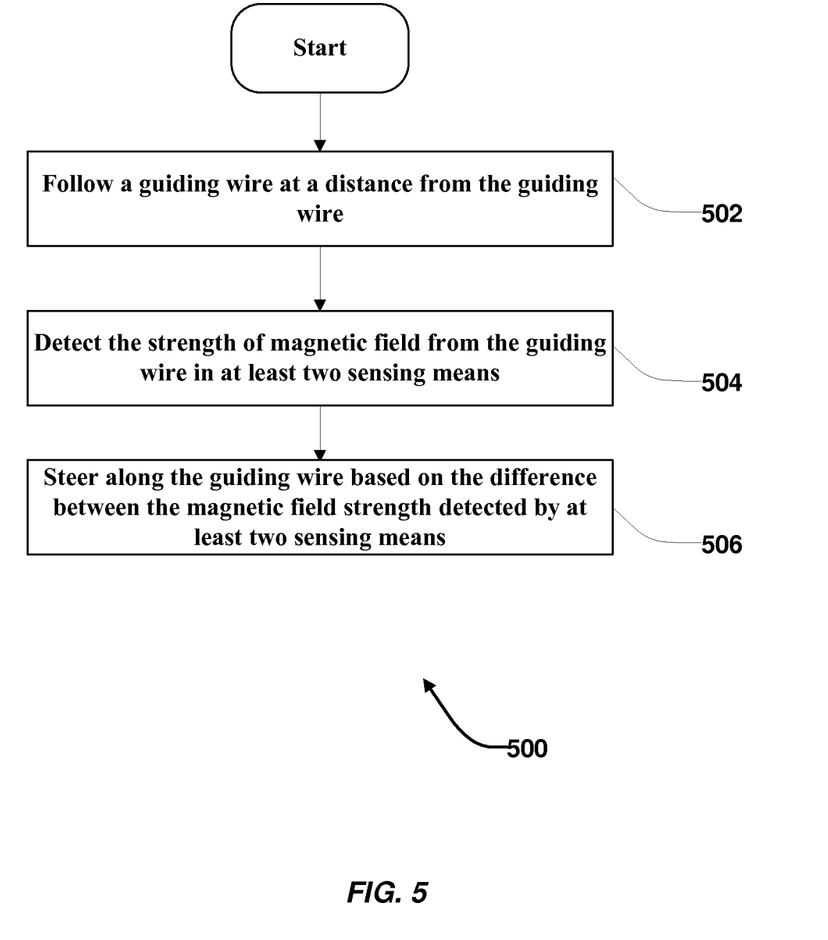
FIG. 5 shows a flow chart of the method for guiding a robotic garden tool according to an embodiment of the present invention.

FIG. 5 illustrates a flow chart of a method 500 for guiding the robotic garden tool 100 according to an embodiment of the present invention. In step 502, the robotic garden tool follows along the guiding wire 402. In an embodiment of the present invention, the guiding wire 402 is a perimeter limiting wire. In various embodiments of the present invention, the guiding wire 402 conducts electric current such that a magnetic field is generated adjacent the guiding wire.

In step 504, the sensing means 108, and 110, detects the magnetic field strength from the guiding wire 402. In an embodiment of the present invention, the sensing means 108 and 110 may be vertical loop sensors. In various embodiments of the present invention, the sensing means 108 and 110 may be placed with a distance L between each other along the longitudinal axis X. In various embodiments of the present invention, the sensing means 108, and 110 are placed on the robotic garden tool 100 such that the sensing means 108 and 110 have different distance from the guiding wire when the robotic garden tool 100 moves along the guiding wire 402. In an embodiment of the present invention, the sensing means 108 and 110 substantially senses a vertical component of the magnetic field produced by the guiding wire.

In various embodiment of the present invention, in addition to the first sensing means 108 and the second sensing means 110, the robotic garden tool 100 further consists of a third sensing means 202 placed on the line Y which line is perpendicular to the longitudinal axis X. Further, in an embodiment of the present invention, the arrangement of the three sensing means 108, 110, and 202 may be mounted in both front and rear part of the robotic garden tool 100 if the robotic garden tool 100 is designed to drive in both directions. In various embodiments of the present invention, the three sensing means 108, 110, and 202 may allow the robotic garden tool 100 to follow the guiding wire in both clockwise and counter clockwise directions.

In step 506, the steering controller 308 steers the robotic garden tool 100 based on relative difference between the detected magnetic field strength in any two of the sensing means 108, 110 and 202. The processing unit 306 may be utilized to provide operating instructions to the steering controller 308 of the robotic garden tool 100. In an embodiment of the present invention, the processing unit 306 provides the instruction to the steering controller 308 based on the detected magnetic field strength which is either stored in the memory unit 304 or received directly form the sensing means 302. In one embodiment of the present invention, the relative difference is considered between the magnetic field strength detected by first and second sensing means 108 and 110. In another embodiment of the relative difference is considered between the magnetic field strength detected by the first sensing means 108 and any one of the second sensing means 110 or the third sensing means 202, whichever senses higher magnetic field strength (or is closer to the guiding wire), for guiding the robotic garden tool 100. In an alternate embodiment of the present invention, the relative difference is considered between the magnetic field strength detected by the first sensing means 108 and any one of the second sensing means 110 or the third sensing means 202, whichever senses lower magnetic field strength (or is farther from the guiding wire), for guiding the robotic garden tool 100.

In an embodiment of the present invention, if the robotic garden tool 100 is in zone 1 410, and the processing unit 306 provides instruction to the steering control to move the robotic garden tool 100 to charging station 404, which is in zone 2 420, then the robotic garden tool 100 is required to pass through the narrow passage 430. In an embodiment of the present invention, since the method 500 uses the relative difference approach, the robotic garden tool 100 always crosses the narrower passages 430 as the relative difference between the magnetic strength detected by any two of the sensing means 108, 110 and 202, may not only be zero but may get negative, if the robotic garden tool 100 approaches opposite guiding wire 402 in the narrower passage.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A guiding system for a robotic garden tool, the guiding system comprising:

at least one guiding wire configured to conduct electric current such that a magnetic field is generated adjacent to the guiding wire, and a robotic garden tool configured to follow the guiding wire at a variable offset from the guiding wire, wherein the robotic garden tool further comprises a first sensor, a second sensor, and a third sensor placed on the robotic garden tool such that they have different distances to the guiding wire when the robotic garden tool moves along the guiding wire, wherein each of the first sensor, second sensor, and third sensor are configured to detect a strength of the magnetic field, wherein the first sensor is placed along a longitudinal axis of the robotic garden tool and the second and third sensors are on opposite respective sides of the longitudinal axis, wherein the first sensor is separated by a distance from the second sensor and the third sensor along the longitudinal axis of the robotic garden tool, the distance extending parallel to the longitudinal axis and the longitudinal axis being parallel to a driving direction of the robotic garden tool, wherein the robotic garden tool is configured to select one of the second sensor or the third sensor based on a magnitude of magnetic field strength detected at each of the second sensor and the third sensor, and wherein the robotic garden tool is configured to be steered along the variable offset from the guiding wire based on a relative difference between detected magnetic field strengths of the first sensor and the selected one of the second sensor or the third sensor.

2. A guiding system according to claim 1, wherein at least one of the first sensor, second sensor, and third sensor are configured to detect the strength of a vertical component in the magnetic field.

3. A guiding system according to claim 1, wherein the first sensor is separated from the second and third sensor along the longitudinal axis of the robotic garden tool by a distance of between 4-30 cm.

4. A guiding system according to claim 1, wherein the distance between the first sensor and the second sensor in a direction perpendicular to the-longitudinal axis of the robotic garden tool is between 5-35 cm.

5. A guiding system according to claim 1, wherein the first sensor, second sensor, and third sensor are placed on the robotic garden tool in a triangle shape, such that the second sensor and the third sensor are placed along a line substantially perpendicular to the longitudinal axis of the robotic garden tool, and the first sensor is placed in front of the line along the longitudinal axis of the robotic garden tool.

6. A guiding system according to claim 5, wherein the distance between the first sensor and the line along which the second sensor and the third sensor are placed, is between 4-30 cm.

7. A guiding system according to claim 1, wherein an angle between the longitudinal axis of the robotic garden tool and a line joining the first sensor to any one of the second sensor and the third sensor is between 40-80°.

8. A guiding system according to claim 1, wherein the guiding wire is a perimeter limiting wire or where the guiding wire is configured to conduct a non-constant current.

9. A method for guiding a robotic garden tool, the robotic garden tool is provided with a first sensor, second sensor, and third sensor, the method comprising the steps wherein the robotic garden tool;

follows a guiding wire at a variable offset from the guiding wire, the guiding wire conducts electric current such that a magnetic field is generated adjacent to the guiding wire, detects the strength of the magnetic field from the guiding wire in each of the first, second, and third sensors, wherein the first, second and third sensors are placed on the robotic garden tool such that they have different distances from the guiding wire when the robotic garden tool moves along the guiding wire and such that the first sensor is placed along a longitudinal axis of the robotic garden tool and the second and third sensors are on opposite respective sides of the longitudinal axis, the first sensor being separated by a distance from the second and third sensors along the longitudinal axis of the robotic garden tool, the distance extending parallel to the longitudinal axis and the longitudinal axis being parallel to a driving direction of the robotic garden tool, selects one of the second sensor or the third sensor based on a magnitude of magnetic field strength detected at each of the second sensor and the third sensor, determines a relative difference between detected magnetic field strengths of the first sensor and the selected one of the second sensor or the third sensor, and steers along the variable offset from the guiding wire based on the relative difference.

10. A method according to claim 9, wherein the robotic garden tool follows a path along the guiding wire such that the difference of magnetic field strength detected by the first sensor and the selected sensor is a constant value throughout an operating cycle of the robotic garden tool.

11. A method according to claim 9, wherein the second sensor and the third sensor are placed along a line substantially perpendicular to the longitudinal axis of the robotic garden tool, and the first sensor is placed in front of the line on the longitudinal axis of the robotic garden tool.

12. A method according to claim 11, wherein the robotic garden tool is steered along the guiding wire based on the difference between the detected magnetic field strength in the first sensor and detected magnetic field strength in one of the second sensor and the third sensor, whichever is closer to the guiding wire.

13. A method according to claim 11, wherein the robotic garden tool is steered along the guiding wire based on the difference between the detected magnetic field strength in the first sensor and detected magnetic field strength in one of the second sensor and the third sensor, whichever is farther from the guiding wire.

14. A guiding system for a robotic garden tool, the guiding system comprising:

at least one guiding wire configured to conduct electric current such that a magnetic field is generated adjacent to the guiding wire, and a robotic garden tool having a longitudinal axis that is parallel to the driving direction of the robotic garden tool, the robotic garden tool further comprising a first sensor placed along the longitudinal axis, a second sensor, and a third sensor placed on an opposite side of the longitudinal axis relative to the second sensor, each sensor being configured to detect a strength of the magnetic field, wherein the second sensor and the third sensor are placed along a line substantially perpendicular to the longitudinal axis of the robotic garden tool, and the first sensor is placed in front of the line on the longitudinal axis of the robotic garden tool wherein the robotic garden tool is configured to select one of the second sensor or the third sensor based on a magnitude of magnetic field strength detected at each of the second sensor and the third sensor, and wherein the robotic garden tool is configured to steer along a variable offset path from the guiding wire based on a relative difference between detected magnetic field strengths of the first sensor and the selected one of the second sensor or the third sensor.

15. A guiding system according to claim 14, wherein at least one of the first sensor, second sensor, and third sensor is configured to detect the strength of a vertical component in the magnetic field.

16. A guiding system according to claim 14, wherein an angle between the longitudinal axis of the robotic garden tool and a line joining the first sensor to any one of the second sensor and the third sensor is between 40-80°.

17. A guiding system according to claim 14, wherein the guiding wire is a perimeter limiting wire.

18. A guiding system according to claim 14 wherein the guiding wire is configured to conduct a non-constant current.

19. A guiding system according to claim 1, wherein the selected one is selected based on which one of the second sensor or the third sensor has a higher magnitude of magnetic field strength detected thereat.

20. A guiding system according to claim 1, wherein the selected one is selected based on which one of the second sensor or the third sensor has a lower magnitude of magnetic field strength detected thereat.

* * * * *